Dec. 9, 1958 J. MOYES 2,863,658
AUTOMOBILE WINDOW MECHANISM
Filed Oct. 4, 1955 4 Sheets-Sheet 1

INVENTOR.
James Moyes.
BY
Harness and Harris
ATTORNEYS

Dec. 9, 1958  J. MOYES  2,863,658
AUTOMOBILE WINDOW MECHANISM
Filed Oct. 4, 1955  4 Sheets-Sheet 2

INVENTOR.
James Moyes.
BY
Harness and Harris
ATTORNEYS

Dec. 9, 1958  J. MOYES  2,863,658
AUTOMOBILE WINDOW MECHANISM
Filed Oct. 4, 1955  4 Sheets-Sheet 3

INVENTOR.
James Moyes.
BY
Harness and Harris
ATTORNEYS.

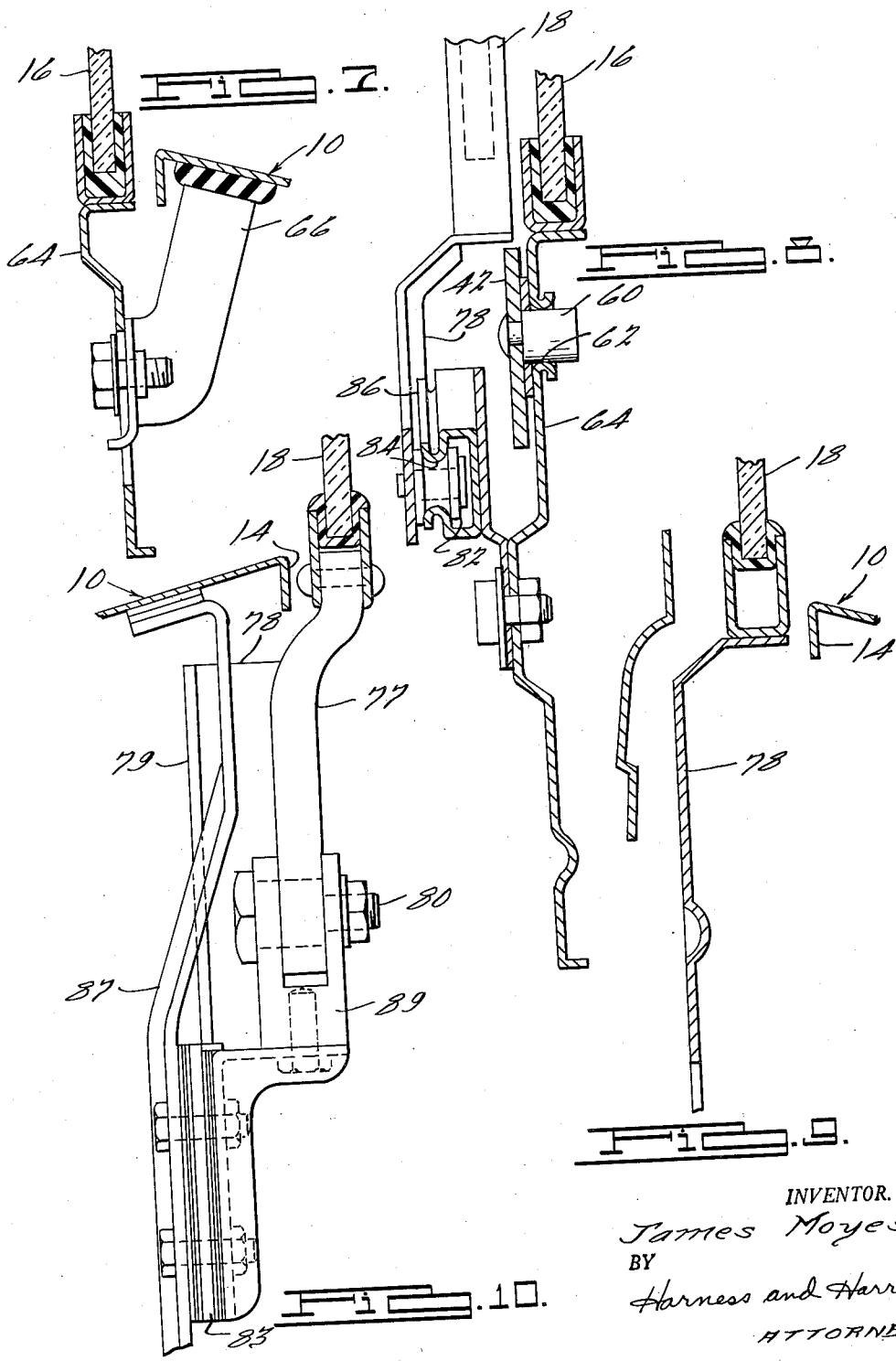

United States Patent Office 2,863,658
Patented Dec. 9, 1958

2,863,658

AUTOMOBILE WINDOW MECHANISM

James Moyes, Pleasant Ridge, Mich., assignor to Chrysler Corporation, Highland Park, Mich., a corporation of Delaware Application October 4, 1955, Serial No. 538,366

1 Claim. (Cl. 268—104)

This invention relates to an automobile window mechanism and more particularly to a window mechanism including a sliding glass element and a rotary glass element movable into overlapping relation with the sliding glass element and to mechanism for operating both of these elements from a single control.

The desirability of a window mechanism of this type evidenced itself as an incident to the creation of automobiles of the four door hardtop variety which have recently been introduced. Heretofore, the conventional four door sedan has had a small vent window pivotally mounted in the rear door for outward swinging movement. This, however, was considered undesirable for a four door hardtop model, because of the desirability of a large uninterrupted opening along the side of the automobile when the windows are opened. The first thought that presents itself is to provide each door with a window which extends the length of the door and which can be lowered into a window well in the door. This, however, is not practical for the rear door of a four door hardtop model for the rear door and rear wheel housing of the modern automobile are so proportioned that such an attempt to lower a window of this length into the door is met with interference between the bottom of the window and the wheel housing before the window is completely lowered.

Some current domestic automobiles have attempted to overcome this problem by providing a window glass that does not extend the full length of the rear door. There is thus an overhang in the neighborhood of six inches in these automobiles where the rear door extends rearwardly beyond the rear edge of the rear window glass. This construction necessitated bringing the rear portion of the roof forward to meet the glass and a portion of the roof structure thus overhangs the rear edge of the door opening. This is undesirable because it obstructs the vision of the rear seat passenger and even more important because it presents a hazard in that one may inadvertently grasp the top of the rear door near its rear edge and slam it with the hand on top of the door. Such action would result in injury to the hand of the operator for it would be sheared between the door and the overhanging roof portion of the automobile.

Applicant recognized that it would be desirable to have a glass which extended substantially throughout the length of the rear door of a four door hard top model and to provide means for retracting the glass completely into the door when desired. This, as mentioned above, also permits the roof construction to terminate in substantial alignment with the rear edge of the door.

It is a principal object of this invention to provide a window mechanism, particularly adpated for use in the rear door of a four door hardtop model of an automobile, and to provide such window mechanism with first and second transparent window elements one of which is adapted for retraction into the door by substantially vertical sliding movement while the other window element is adapted for retraction into the door by rotary movement so that portions of the window elements overlap each other as they are retracted.

It is also an object of the invention to provide such window mechanism with a single control means and mechanical means responsive to operation of the single control means for imparting substantially simultaneous downward movement of the vertically sliding window element and rotary movement of the other window element to the end that one operation effects a lowering of both window elements.

It is a further object of the invention to provide a window construction in which the upper edge of the cooperating window elements maintains a curved line that is substantially uninterrupted throughout all positions of the window elements as they are lowered into the door.

It is recognized that some current two door hardtop models utilize a vertically sliding window element in the door and a pivotally mounted quadrant type of window element behind the door. This construction, however, would not be suitable for the 4-door hardtop model for the appearance presented in partially retracted positions of the window elements would not be particularly pleasing and applicant finds it more satisfactory to provide mechanism that substantially simultaneously lowers the glass elements and to provide means for lowering them so that they overlap rather than separate.

The terms "vertical" and "substantially vertical" will be used herein in describing the path of movement of the downwardly sliding window element and it is to be understood that the downward path of movement of the window element may depart somewhat from a true vertical path because of the necessity of having the window element miss the hinge structure which supports the door on the vehicle body. Thus, even though the window element moves on a slightly inclined path it is meant that this inclined path fall within the meaning of the terms "vertical" and "generally vertical" as used herein.

Figure 1:
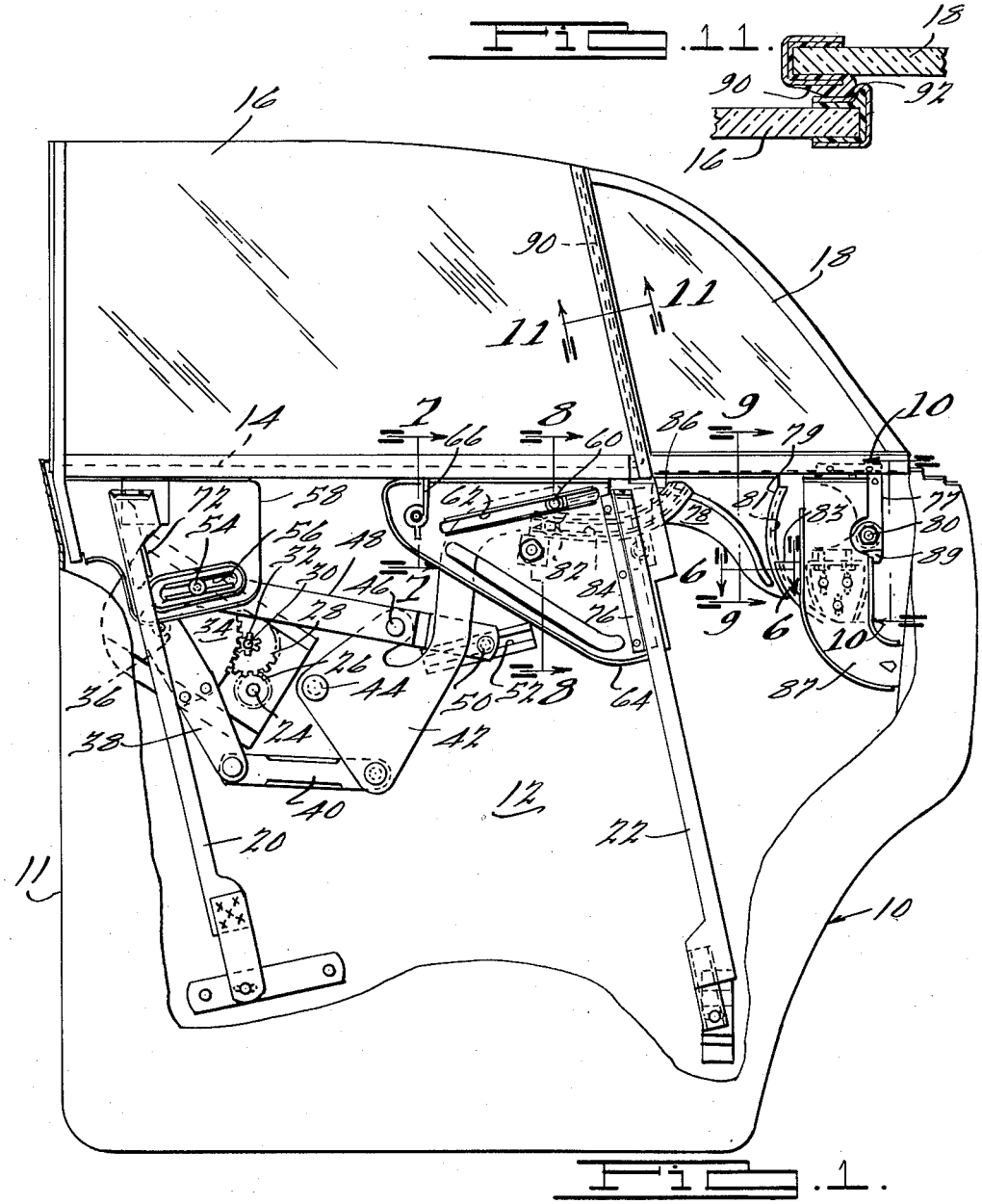
Fig. 1 is a side elevation, partly broken away, of a vehicle door incorporating my window mechanism and showing the window elements in their fully exposed position.
Figure 12:
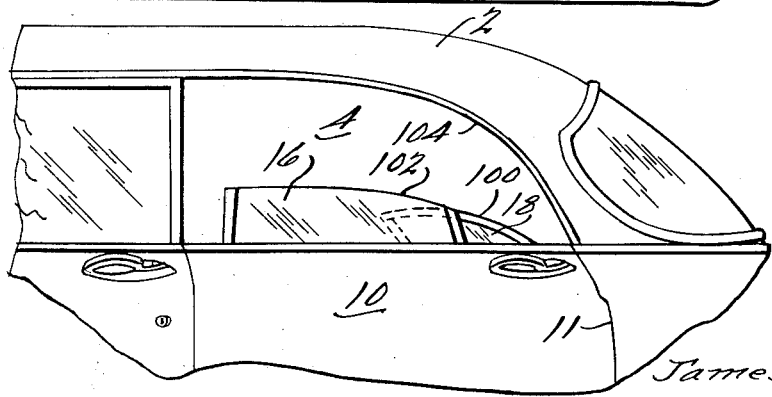

Figs. 6 through 11 are fragmentary sectional views taken on the lines 6—6, 7—7, 8—8, 9—9, 10—10 and 11—11 respectively of Fig. 1; and Fig. 12 is a side elevational view of a portion of an automobile body equipped with my window mechanism.

Figure 2:
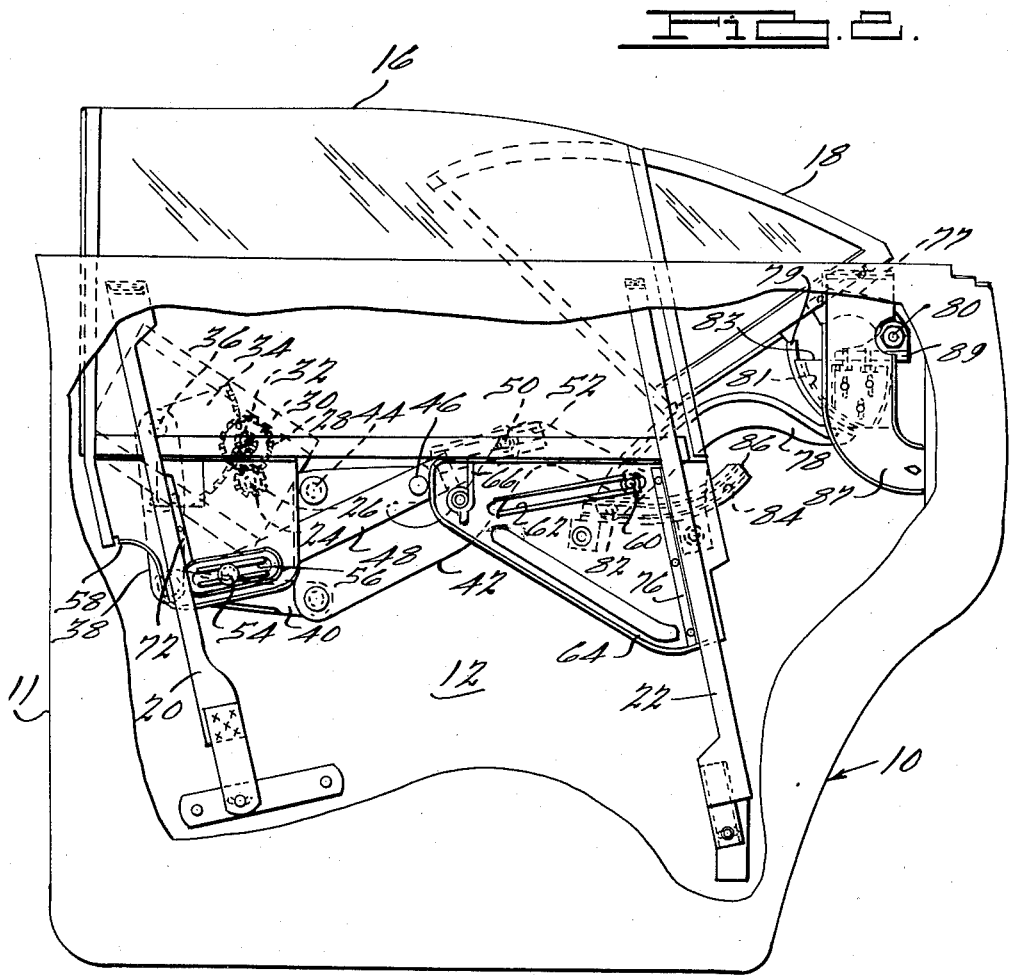
Fig. 2 is a side elevational view, partly broken away, corresponding generally to Fig. 1, but showing the window elements in an intermediate or partially lowered position.
Figure 3:
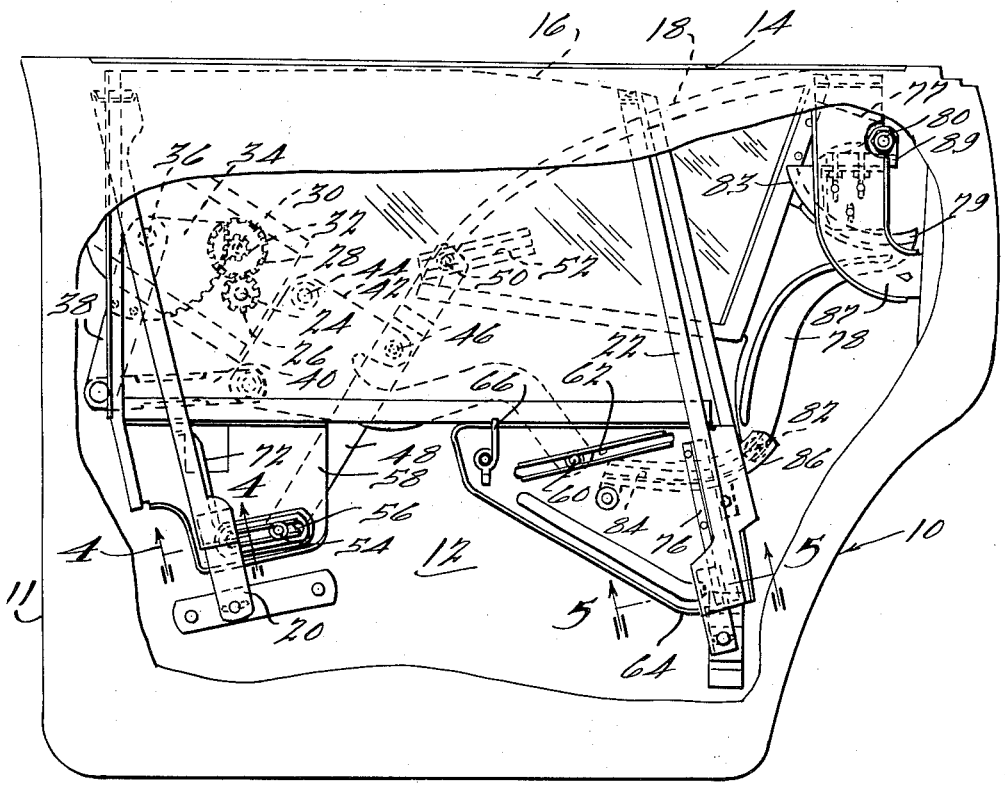
Fig. 3 is a side elevational view of an automobile door, corresponding to Figs. 1 and 2, but showing the window elements in their completely retracted position.
Figure 5:
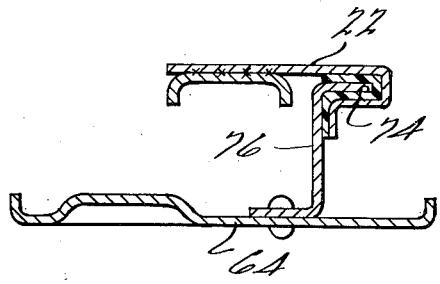
Fig. 5 is a fragmentary sectional view taken on the line 5—5 of Fig. 3.
Figure 4:
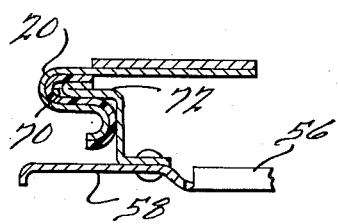
Fig. 4 is a fragmentary sectional view taken on the line 4—4 of Fig. 3.

A portion of an automobile body is illustrated in Figure 12 and it will be noted that it includes a top structure 2 and a lower body structure which includes a door 10. The top structure 2 and door 10 cooperate to define a window opening 4 therebetween. The door 10 is hinged along its forward edge 11 and is of hollow construction with a window well 12 defined thereby as illustrated in Figures 1, 2 and 3. The window well 12 terminates in a horizontal slot 14 which is visible in Figs. 3 and 9 and which forms an upper entrant portion for the window well 12 through which window elements to be described herein will pass as an incident to their retraction to a concealed position within the window well 12.

A window element 16 is provided in the forward portion of the door and is adapted for substantially vertical sliding movement down through the slot 14 and into the window well 12 and a smaller window element 18 is shown in Fig. 1 as located to the rear of the window element 16. The window element 18 is adapted for rotary movement into overlapping relationship with the window element 16 and retraction through the slot 14 into the window well 12.

Lowering of the window element 16 is accomplished by mechanical linkages which follow a rather conventional construction, but which will be briefly described herein. A pair of guides 20 and 22 are carried within the door 10 and are secured to the door at their respective ends. These guides define a slightly inclined, but generally vertical path for the window element 16 to follow. A shaft 24 is rotatably mounted in the door 10 and comprises a control means which may be adjusted to position the window elements. In accordance with common practice the shaft 24 may have an interior operating handle (not shown) for manual manipulation of the windows or in the alternative it may be connected to a suitable power source for rotating it. Electric motors or hydraulic motors are suitable for this purpose as is known in the art. The shaft 24 carries a pinion 26 which meshes with a larger pinion 28 which is keyed to a shaft 30 and carries a pinion 32 in meshed engagement with a sector 34 which is pivotally mounted on the door at 36 and is adapted to be rotated by manipulation of the shaft 24 through the gear train just described. An arm 38 is mounted on the sector 34 and adapted to rotate therewith. The arm 38 carries a link 40 which is in turn carried by a member 42 which is pivotally mounted on the door at 44. The member 42 is connected at 46 to a lever 48 intermediate the ends of the lever 48. One end of the lever 48 carries a cam follower 50 which moves in a track 52 which is secured to the door 10 and the other end of lever 48 carries a cam follower 54 which is positioned in a track 56 formed in a plate 58 which is secured to one side of the lower portion of the window element 16. It will thus be seen that rotation of sector 34 in a clockwise direction in Fig. 1 moves the link 40 to the left in Fig. 1 and rotates member 42 in a clockwise direction and that this movement causes the lever 48 to pivot about the cam follower 50 for rotation in a counterclockwise direction and lowering of the cam follower 54, plate 58 and the left side of the window element 16 in Fig. 1 are affected.

Lowering of the right side of window element 16 in Fig. 1 is accomplished by the same rotation of member 42 in a clockwise direction. Member 42 is provided with a cam follower 60 which is positioned in a slot 62 provided in a plate 64 which is secured to the lower portion of the right side of window element 16. Thus clockwise rotation of member 42 causes a lowering of cam follower 60 and the right side of window element 16. A suitable stop 66 is provided on plate 64 for engagement with an upper edge of door 10 when the window element 16 has been raised to its upper limit.

The guide 20 is preferably provided with a nylon lined groove 70 while the plate 58 carries a flange 72 which is slidably mounted in the groove 70 to guide the window element 16 during its substantially vertical movement. Similarly, the guide 22 is provided with a nylon lined groove 74 which receives a leg 76 carried by the plate 64 to guide the right side of the window element 16 during its substantially vertical movement.

Having described the mechanism for lowering the window element 16 and it being understood that a raising of the window is accomplished by changing the direction of rotation of the shaft 24 I will now describe a mechanism for causing the window element 18 to retract to a concealed position in the window well 12 with the understanding that a reversal of the direction of movement of the mechanical linkages will cause its elevation to an exposed position above the door 10. The window element 18 carries a bracket 77 and a frame structure 78 each of which is secured to the lower edge of the window element 18. The bracket 77 is pivotally mounted at 80 on a fixed bracket 89 which is secured to a bracket 87 carried by the door 10. The frame structure 78 carries a cam follower 82 which is positioned in a track 84 of a track element 86 which is secured to plate 64. Lowering or raising of the plate 64 as previously described thus induces movement of the cam follower 82 and this in turn through the frame structure 78 causes the window element 18 to rotate about its pivotal mounting 80 substantially simultaneously with movement of the window element 16 in its generally vertical path.

The frame 78 is preferably provided with an arcuate flange 79, which is visible in Figures 1, 2, 3 and 6. The flange 79 is adapted to cooperate with an arcuate slot 81 in a fixed member 83 which is carried by bracket 87 which is secured to the door 10. The flange 79 is guided in a slot 81 as the window element 18 is rotated and lateral stability is thereby imparted to the window element 18.

The window elements 16 and 18 are preferably located in close proximity, but in parallel planes, so that the window element 18 is slightly offset laterally to window 18 as illustrated in Fig. 11. This accommodates an overlapping relationship to be established as the window elements 16 and 18 occupy intermediate and lowered positions. An enlarged sealing element 90 is preferably carried by the rotatably mounted window element 18 as illustrated in Fig. 11 and a stop 92 is carried by the window element 16 to limit the relative movement of the window elements when they reach the upper limit of their travel.

In the preferred embodiment of my mechanism the curvatures and rates of motion of the window elements are preferably selected so that an upper exposed edge 100 of the window element 18 is substantially aligned with an upper exposed edge 102 of the window element 16 as illustrated in Fig. 12. The uninterrupted upper edge 100 and 102 of the glass elements presents a pleasing appearance in that it is generally symmetrical to a downward curved margin 104 provided on the top structure 2 of the automobile.

I claim:

In a vehicle body having lower body structure and a top structure cooperating with said lower body structure to define a window opening having a leading and a trailing portion, said lower body structure having a window well with an upper entrant portion formed therein; a first substantially vertical rectangularly shaped window element movable between a first exposed position in which it closes a leading portion of the window opening to a second concealed position in which it is retracted through said upper entrant portion and is positioned in said window well, guiding mechanism carried by said lower body structure, said first window element including cooperating means operatively connected to said guiding mechanism to guide said first window element in a generally vertical path for movement between its first exposed position and its second concealed position, a second window element pivotally mounted on a horizontal axis on said lower body structure in the vicinity of the trailing edge of the window opening for rotary movement between an exposed position in which it closes a trailing portion of the window opening and a concealed position in which it is retracted through said upper entrant portion and is positioned in said window well, said second window element having a sector shape with a leading straight edge in alignment with a trailing edge of said rectangularly shaped first window element when said window elements are positioned to close said window opening and with a curved trailing edge which extends from the upper trailing corner of said first window element to a lower rear corner of said window opening when the window elements are in their respective raised, exposed positions, said second window element being located in a plane parallel to the plane of said first window element so that an overlapping relationship is maintained between said window elements as said second window element is rotated about its horizontal axis, linkage operatively connecting said second window element and said first window element to induce rotary movement of said second window element toward its concealed position as an incident to movement of said first window element in its above mentioned generally vertical path, said linkage inducing such rotary movement of said second window element at a rate relative to movement of said first window element such that as said first window element is retracted into said window well a progression of points on the above mentioned curved trailing edge of said second window element register in an overlapping relationship with the upper trailing corner of said first window element, said curved trailng edge of said second window element having a curvature preselected so that as each point thereon registers in an overlapping relationship with the upper trailing corner of said first window element every other point on said curved trailing edge is, at that time, located at an elevation lower than the elevation of said upper trailing corner of said first window element thereby to define a visible upper margin of said windows which is of gentle, uninterrupted curvature, said linkage also serving as an interlocking means to prevent lowering of said window elements at any other relative rate whereby registry at all times of one point on said curved trailing edge of said second window element with the upper trailing corner of said first window element is assured, and operating mechanism operatively connected to said first window element and adapted to selectively impart movement to said first window element in its said path.

References Cited in the file of this patent

UNITED STATES PATENTS

| | | |
|---|---|---|
| 1,632,949 | Christofferson | June 21, 1927 |
| 2,122,963 | Susor | July 5, 1938 |
| 2,131,745 | Morrison | Oct. 4, 1938 |
| 2,190,976 | Campbell | Feb. 20, 1940 |
| 2,253,805 | Olivier | Aug. 26, 1941 |